April 25, 1950     D. D. GRIEG     2,504,975
RADIO PULSE TYPE DISTANCE MEASURING SYSTEM
Filed March 13, 1944     3 Sheets-Sheet 1

INVENTOR.
DONALD D. GRIEG
BY
ATTORNEY

April 25, 1950 D. D. GRIEG 2,504,975
RADIO PULSE-TYPE DISTANCE MEASURING SYSTEM
Filed March 13, 1944 3 Sheets-Sheet 3

TIME

INVENTOR.
DONALD D. GRIEG
BY
*R P Morris*
ATTORNEY

Patented Apr. 25, 1950

2,504,975

UNITED STATES PATENT OFFICE 2,504,975

RADIO PULSE TYPE DISTANCE MEASURING SYSTEM

Donald D. Grieg, Forest Hills, N. Y., assignor to Federal Telephone and Radio Corporation, New York, N. Y., a corporation of Delaware Application March 13, 1944, Serial No. 526,176

5 Claims. (Cl. 343—13)

This invention relates to a system for measuring the time interval between the pulses of pairs of pulses forming a wave train and more particularly to a system particularly useful for measuring the distance between a single object and a plurality of other objects provided with radio repeaters.

Systems have been proposed in which the distance between a single object and other objects as well as the identity of the other objects may be obtained by the transmission time of radio pulses transmitted from the first object to the other objects at which point they are repeated again and received at the single object. In such systems, the forms of indicators used for determining the identity in general are quite complex and not readily adaptable for use on small aircraft, for example.

It is an object of my invention to provide a system for measuring the time interval between pulses of pairs of pulses forming a wave train.

It is a further object of my invention to provide a system for selectively measuring the time interval between pulses of pairs of pulses forming wave trains in which the pairs of pulses of the different trains may be differently spaced.

It is a still further object of my invention to provide a system for measuring the distance to and/or identifying several objects at a single station by the use of radio pulses transmitted from and received at said single station after being repeated from said objects and producing from said transmitted and repeated pulses a train of pulse pairs having a predetermined spacing between the pairs of pulses and a variable spacing depending upon distance between the pulses of each pair.

According to a feature of my invention, I produce an impulse train, from pairs of pulses of a pulse train, of such a nature that the impulses have a dimensional characteristic as, for example, amplitude or a duration proportional to the spacing between pulses of a pair of pulses and measure the peak amplitude of these produced impulses or compare the duration of them with a series of pulses of fixed duration to provide a measure of time between such pulses. In the embodiment of my invention wherein the system is used to produce identification signals and distance measurements at a single location from any of a plurality of other locations, I provide at the single location a transmitter for transmitting trains of pulses over a predetermined radiation field. These trains of pulses may be selectively altered in timing or repetition rate. In each of the other locations, the distance and identity of which is to be determined are provided repeaters responsive only to pulse trains of a predetermined repetition rate. These repeated pulses are received at the single location and together with the directly transmitted pulses produce a train of pairs of pulses in which the spacing between the pulses of each pair is proportional to the two way travel time of the radiated pulses, plus a short time delay in the repeaters, and hence is substantially proportional to the distance to the other location. The distance may then be measured by use of the time interval measuring system described briefly above and the identity of the repeater may be obtained by the repetition rate of the received signal.

A better understanding of my invention and the objects and features thereof may be had from the particular description thereof made with reference to the accompanying drawing, in which.

Figure 1:
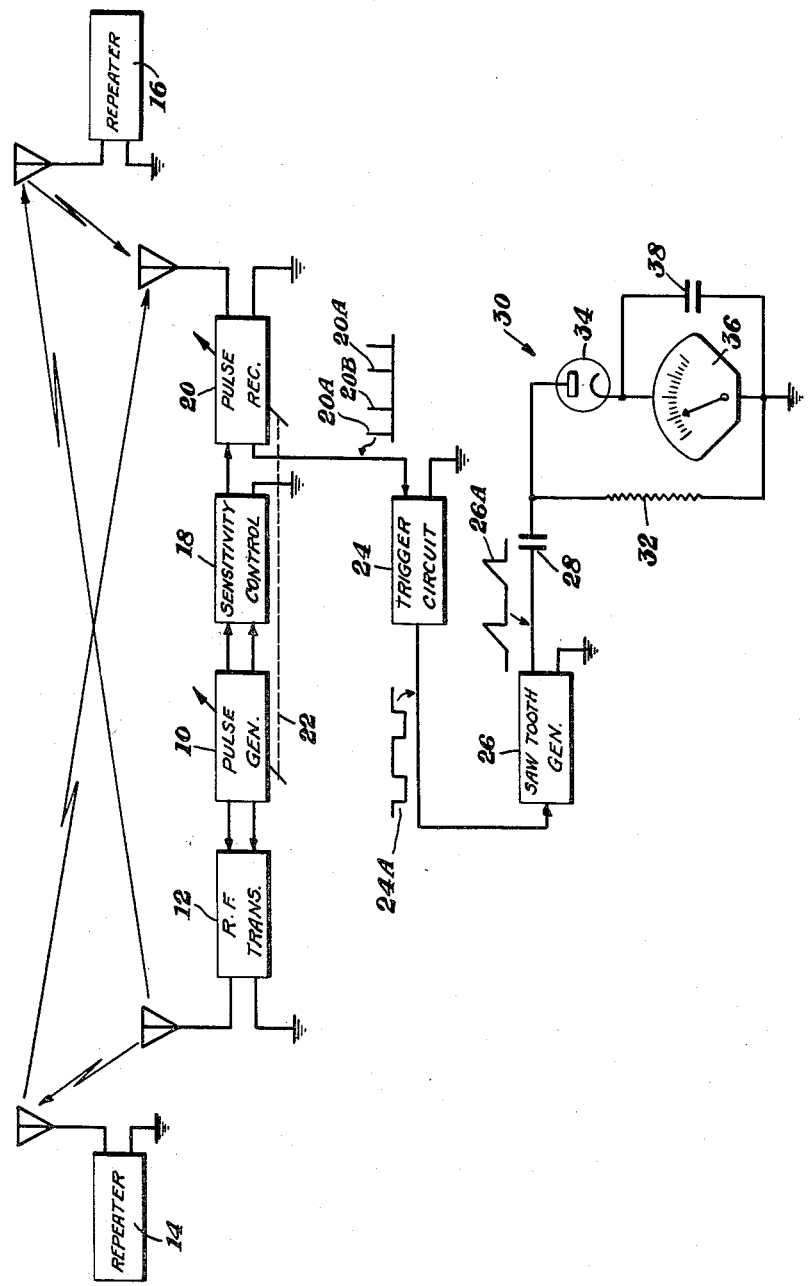
Fig. 1 is a block circuit diagram of a distance measuring system incorporating the features of my invention.

Turning first to Fig. 1, 10 represents a pulse generator, for example of the unbalanced multivibrator type, capable of producing trains of pulses at adjustable repetition rates. Energy from pulse generator 10 is applied to radio frequency transmitter 12 from which it is radiated over an area which may contain one or more repeaters, such as indicated at 14 and 16. Preferably these repeaters are of a type similar to that described in the patent, Number 2,266,401, issued to A. H. Reeves on December 16, 1941, and are individually adjusted to have a response characteristic substantially at one of the adjustable repetition rates of pulse generator 10. For example, repeater 14 may respond to and repeat at one pulse repetition rate while repeater 16 may respond to and repeat at a different rate. Thus, the repeaters will not both be responsive simultaneously to the same train of transmitted pulses. At the first station and cooperating with transmitter 12 is provided a pulse receiver 20. During the transmission of pulses from transmitter 12, pulses from generator 10 are applied to sensitivity control apparatus 18 which serves to reduce the sensitivity of receiver 20 to such a level that only the strong radiated pulses from transmitter 12 can be received. Such controls are well known in the art and need no detailed illustration.

After each pulse of a train of pulses has been transmitted, receiver 20 becomes sensitive to repeated pulses from repeaters such as 14 and 16. Preferably, receiver 20 if of a type similar to that described in the patent, Number 2,266,401, issued to A. H. Reeves on December 16, 1941, and is simultaneously adjusted with pulse generator 10 by means of a common control 22 so that it will be responsive only to received pulses of the repetition rate of pulse generator 10. The directly received pulses from transmitter 12 and the repeated pulses from one of the repeaters 14, 16 appear in the output of pulse receiver 20 as a train of pairs of pulses 20A and 20B. These output pulses may be applied to trigger circuit 24 producing in the output thereof substantially rectangular impulses 24A having a time duration substantially equal to the time spacing between pulses 20A and 20B. These rectangular impulses may be applied to a further generator such as sawtooth generator 26 to produce substantially sawtooth shaped waves 26A. These sawtooth waves have substantially constant slope and a duration substantially equal to the duration of the rectangular impulses 24A. As a consequence, the amplitude of the sawtooth impulses will be substantially proportional to the time spacing between pulses 20A and 20B, and hence to the distance between the single location and the effective repeater.

These sawtooth pulses are applied over a coupling condenser 28 to a volt meter circuit 30 which is adjusted to read substantially only the peak voltage values of these waves. Volt meter 30 comprises a high resistance 32 bridged across a rectifier 34 and ammeter 36 in series to ground. Because of the characteristics of the diode rectifier and the resistance element 32, only the peak values of the waves applied to the circuit will have effect on the ammeter 36 so that the meter reading will be substantially determined by the peak values of these input waves. Ammeter 36 may be calibrated directly in distance so that the distance may be read directly on this meter. A by-pass condenser 38 is shunted above ammeter 36 to prevent any high frequency components from traversing the meter circuit.

It should be noted that since the meter circuit reads peak values only, a change in the pulse repetition rate, or a random variation of this rate, will not change the peak value and therefore the distance indicated by the meter will be independent of such variations. While in the case of moving craft, the spacing between the pulses of adjacent pairs will vary, the pulse repetition rate is generally sufficiently high so that many pairs of pulses will be received before an appreciable change in spacing takes place. In this example, the meter distance reading will change with the change in aircraft location.

It will be readily apparent that the system arranged at the single location is relatively simple and suitable for use on an aircraft. With such a system the repeater stations may constitute different possible objectives of the aircraft and may be identified by different repetition frequency rates. On the craft the identity of the repeater system may be obtained by a knowledge of the repetition rate to which the system is adjusted and the distance thereto may be obtained by the readings on ammeter 36. Sawtooth generator 26 may be a known form of modified multi-vibrator circuit with the time constants properly adjusted. The multi-vibrator may be one of the type which is stable in one condition of operation and remains in that condition until it is triggered into operation by a first impulse, such as 24A.

If a single impulse is applied, the multi-vibrator will continue to build up the wave at a predetermined rate until saturation is reached, after which it will return to its first or stable position. However, if a second control pulse is applied before the multi-vibrator reaches this saturated condition, this pulse may be made to trigger it back to its first stable condition. The normal operation time of the multi-vibrator should be such that it will return by itself to its stable condition before the second pulse of a regular transmitted train is radiated. However, the distance measuring feature normally occupies only a small fraction of the time spacing of the normally transmitted pulses so that the system is operative over a wide range of pulse repetition rates.

Figure 2:
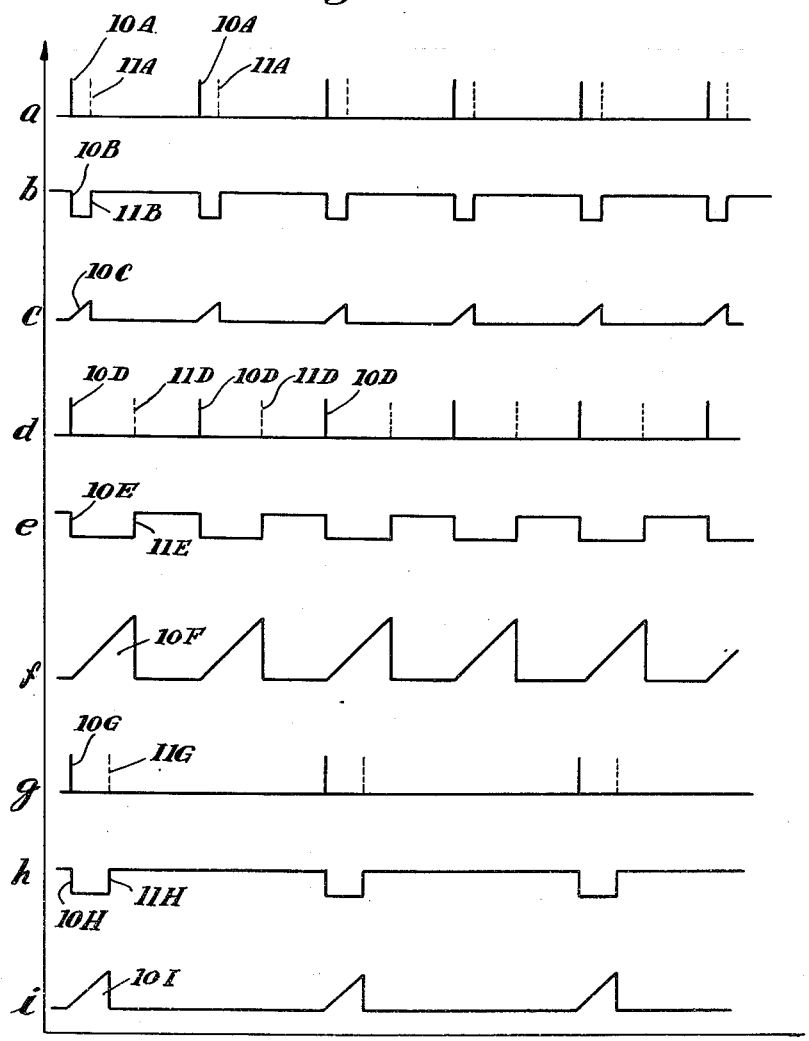
Fig. 2 is a set of curves used to explain the operation of the system of Fig. 1.

A clearer understanding of the operation of the system in accordance with my invention may be had by reference to the curves of Fig. 2. In this figure, curve $a$ represents the output of a receiver, such as 20, in which the pulses are transmitted at a repetition rate represented by the solid vertical lines 10A. The received repeated pulses are represented by the dotted lines 11A, spaced from pulses 10A. These pairs of pulses serve to produce substantially rectangular pulses, as shown in curbe $b$, having a leading edge 10B and a trailing edge 11B corresponding to the spacing of pulses 10A, 11A. These rectangular pulses serve to produce sawtooth oscillations as shown in curve $c$. These sawtooth impulses 10C have a predetermined slope dependent on the time constants of the sawtooth generator and an amplitude dependent upon the spacing of pulses 10A and 11A.

In curve $d$ is shown another set of pulses having the same repetition rate indicated by pulses 10D. Received pulses 11D, however, represents the repeated pulses in which the spacing between the single station and the repeater is considerably greater than in the first case described. These pulses 10D and 11D serve to produce rectangular pulses, curve $e$, indicated with leading and trailing edges 10E, 11E, respectively, which, in turn, produce the sawtooth impulses of curve $f$, as indicated at 10F. It will be noted that these sawtooth impulses have the same slope as impulses 10C but reach a higher amplitude due to the greater duration of the impulses. Thus, the meter circuit will indicate a differing distance reading.

A still further example of pulses having a different repetition rate and a different distance is indicated in curve $g$ by 10G and 11G, respectively. These pulses produce a train of rectangular impulses having leading and trailing edges 10H and 11H, respectively, as shown in curve $h$. In turn, these rectangular impulses produce the sawtooth impulses 10I of curve $i$ having the same slope as impulses 10C and 10F and in amplitude dependent upon the duration of the rectangular pulses of curve $h$.

It will be readily apparent that the circuit, above described, is made merely by way of example and that many modifications are possible. For example, wave generator 26 may be replaced by a generator operated directly from pulses 20A and 20B, if desired, instead of through trigger circuit 24. However, such a circuit is more difficult to adjust and therefore the simpler circuit illustrated is generally preferred.

Figure 3:
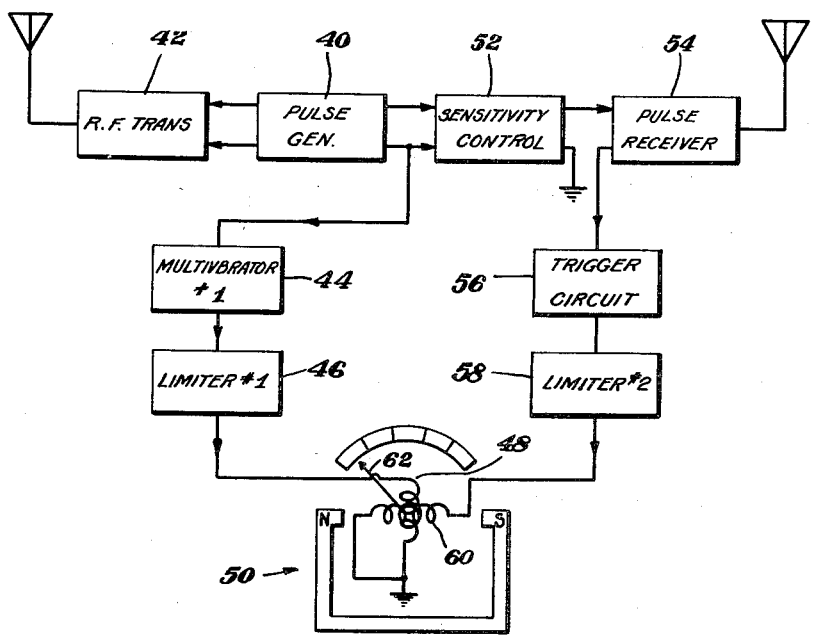
Fig. 3 is a modified form of my invention shown in block circuit diagram.

The system described in connection with Fig. 1 gives a satisfactory and accurate measurement of distance provided constants of the sawtooth generating system are maintained. However, this operation is dependent upon the voltage supply, the slope of the sawtooth waves varying with change in voltage. This may, of course, be overcome by suitable voltage regulating means. However, an alternative circuit arrangement, as shown in Fig. 3, may be used which circuit is substantially independent of the voltage supply in the receiver.

Figure 4:
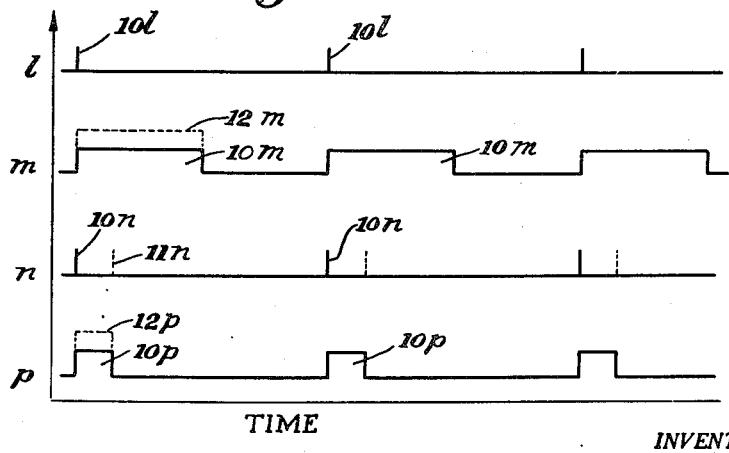
Fig. 4 is a set of curves used to explain the operation of the circuit of Fig. 3.

According to this system, pulses from pulse generator 40 are applied to radio frequency transmitter 42 to transmit pulses to a repeating object. These pulses, after repetition, are received in pulse receiver 54 together with the directly transmitted pulses to produce pulse pairs similar to those described previously. A sensitivity control circuit 52 interconnects pulse generator 40 and receiver 54 to reduce the sensitivity of receiver 54 during the times of transmission to such a value that only strong radiated pulses from 12 will be received. The transmitted pulses may be as shown in Fig. 4, curve $l$ at 10$l$. At the same time, pulses from generator 40 are applied to a multivibrator 44 producing rectangular impulses 10$m$, curve $m$, Fig. 4. These rectangular impulses 10$m$ are of substantially constant duration and of a duration longer than the spacing between the directly received and reflected pulses in the output of receiver 54. Preferably, this duration corresponds in distance to the maximum distance it is desired to measure. If desired, a limiter 46 may be used lead to limit the amplitude of impulses 10$m$ to a constant level. These impulses are then applied to one of the deflecting coils 48 of a cross coil ratio meter 50. The pairs of pulses from the output of receiver 54 indicated diagrammatically in curve $n$ of Fig. 4 at 10$n$, 11$n$ operate a trigger circuit 56 to produce rectangular impulses 10$p$, curve $p$, Fig. 4. These impulses may be applied over a voltage limiter 58 to the other coil 60 of cross coil ratio meter 50. The two coils will then take up a resultant position moving pointer 62 to a point on the scale dependent upon the ratio of energy from 10$m$ and 10$p$. This ratio may be calibrated in terms of distance so that the distance of this transmitter-receiver arrangement from a repeating point may be determined independently of the repetition rate of the pulses transmitted from 42. Accordingly, the circuit may be tuned to different repetition rates in the same manner as the circuit of Fig. 1 for the purpose of selectively energizing and identifying different repeater stations.

It should be further understood that, since the multi-vibrator and the trigger circuits may all be energized from the same source of supply, variation in this supply voltage will have no effect on the readings of meter 50. If the supply voltage is stronger, impulses 10$m$ will increase to a value 12$m$ and impulses 10$p$ to a value 12$p$ but the ratio between the two will still remain the same. It can, in addition, be readily seen that this system is independent of repetition rate and gives an accurate measure of distance. It should further be understood that any desired type of ratio meter may be used instead of the specific cross coil arrangement disclosed herein.

It should be distinctly understood that the illustrations herein are given merely by way of example and not as a limitation on my invention, as set forth in the objects thereof and in the accompanying claims.

What is claimed is:

1. A time interval measuring system for measuring the time interval between the pulses of pairs of pulses forming a pulse train, comprising circuit means for producing substantially given amplitude rectangular impulses of a duration equal to the spacing between the pulses of each pair of pulses, means for producing other substantially given amplitude rectangular impulses having a constant duration greater than the greatest spacing of said pairs of pulses, and means for measuring the energy ratio between said rectangular pulses first named and said other rectangular pulses to measure said time interval.

2. A radio system for measuring the distance between a single object and repeater stations having different pulse repetition rates, comprising a transmitter means at said object for transmitting trains of pulses having an extremely short duration, means for adjusting said transmitter to transmit said short duration pulses at different repetition rates corresponding to the respective repeaters, said repeaters serving to repeat the trains of said pulses at their respective repetition rates, receiver means for receiving said short duration pulses directly transmitted from said transmitter and said repeated short duration pulses, whereby in the output of said receiver means appear pulse pairs having the leading pulses spaced apart in time a distance determined by the pulse repetition rate, the pulses of each pair being of extremely short duration and spaced apart by a time determined by the distance between said object and the repeater, means for producing from said pairs of pulses impulses having a dimensional characteristic determined by the time spacing between the pulses of each pair means for producing a reference impulse having a dimensional characteristic determined by the time spacing between said repetition pulses and means for comparing the dimensional characteristics of said impulses with said reference impulses to determine the said distance.

3. A radio system according to claim 2, wherein said means for producing impulses from said pairs comprises a circuit means for producing substantially rectangular impulses having the duration substantially equal to the time spacing between the pulses of each pair, and said reference impulse producing means comprising means for producing other rectangular impulses, said means for measuring the dimensional characteristics of said first named impulses comprising a circuit for comparing two energy values and means for applying said said first named impulses and said reference impulses to said comparing circuit to produce an indication dependent upon the ratio of the energy of said applied pulses.

4. A radio system for measuring the distance from a single object to other objects comprising means for transmitting from said single object a train of pulses having an extremely short duration and a predetermined repetition rate, means for adjusting said means for transmitting said short pulses to alter said predetermined repetition rate to produce trains of pulses having different predetermined repetition rates, means for receiving and retransmitting said trains of pulses at respectively different ones of said repetition rates at respective ones of said objects, means at said single object for receiving said transmitted short duration pulses at a time interval after the transmission of the pulses of said train dependent upon the distance of said other object from said single object, means at said single object for adjusting the associated receiver means selectively to respond to the different predetermined repetition rates, means for producing a train of impulses having dimensional characteristics dependent on said interval, and means for producing other impulses having a dimensional characteristic determined by said selected repetition rate, and means for comparing the dimensional characteristics of said impulses and said other impulses to determine said distances, whereby the identity of said other objects may be indicated by the repetition rate adjustment.

5. A time interval measuring system for measuring the time interval between the pulses of pairs of pulses forming a train of pulses, said pulse pairs having a variable time interval, comprising trigger circuit means for producing a substantially given amplitude rectangular impulse of a duration equal to the spacing between the pulses of a pair of pulses, a wave generator for producing other substantially given amplitude rectangular impulses having a fixed duration and a predetermined pulse recurrence frequency, a circuit for measuring the ratio of the output of two energy sources and means for applying said impulses first named and said other impulses to said measuring circuit for indicating the relative time duration of said impulses first named.

DONALD D. GRIEG.

REFERENCES CITED

The following references are of record in the file of this patent:

UNITED STATES PATENTS

| Number | Name | Date |
|---|---|---|
| 1,765,585 | Herman | June 24, 1930 |
| 2,134,716 | Gunn | Nov. 1, 1938 |
| 2,165,690 | Wademan | July 11, 1939 |
| 2,208,349 | Ulbright | July 16, 1940 |
| 2,250,708 | Herz | July 29, 1941 |
| 2,287,174 | Heising | June 23, 1942 |
| 2,359,447 | Seeley | Oct. 3, 1944 |
| 2,391,411 | Goble et al. | Dec. 25, 1945 |
| 2,404,527 | Potapenko | July 23, 1946 |
| 2,412,111 | Wilson | Dec. 3, 1946 |
| 2,419,571 | Labin et al. | Apr. 29, 1947 |
| 2,421,248 | De Forest | May 27, 1947 |

FOREIGN PATENTS

| Number | Country | Date |
|---|---|---|
| 469,417 | Great Britain | July 26, 1937 |